United States Patent [19]

Pinto

[11] Patent Number: 5,039,510
[45] Date of Patent: Aug. 13, 1991

[54] STEAM REFORMING

[75] Inventor: Alwyn Pinto, Cleveland, England

[73] Assignee: Imperial Chemical Industries PLC, London, England

[21] Appl. No.: 197,573

[22] Filed: May 23, 1988

Related U.S. Application Data

[62] Division of Ser. No. 767,067, Aug. 19, 1985, Pat. No. 4,750,896, which is a division of Ser. No. 591,328, Mar. 19, 1984, abandoned.

[51] Int. Cl.⁵ .............................................. C01B 3/26
[52] U.S. Cl. .................................... 423/652; 252/373; 252/376; 423/653; 423/654
[58] Field of Search ............... 423/651, 652, 653, 654; 422/197, 193, 312; 252/373, 376; 48/214 A; 208/79, 70, 64, 63

[56] References Cited

U.S. PATENT DOCUMENTS

| | | | |
|---|---|---|---|
| 1,960,912 | 5/1934 | Larson | 423/653 |
| 3,264,066 | 8/1966 | Quartulli et al. | 423/654 |
| 3,607,125 | 9/1971 | Kydd | 422/197 |
| 3,958,951 | 5/1976 | Woebcke et al. | 252/373 |
| 4,071,330 | 1/1978 | Sederquist | 423/653 |
| 4,098,588 | 7/1978 | Buswell et al. | 422/197 |
| 4,162,290 | 7/1979 | Crawford et al. | 423/652 |
| 4,271,086 | 6/1981 | Supp et al. | 252/373 |
| 4,479,925 | 10/1984 | Shires et al. | |
| 4,552,741 | 11/1985 | Melchior | 423/652 |
| 4,650,651 | 3/1987 | Fuderer | 422/197 |
| 4,690,690 | 9/1987 | Andrew et al. | 423/651 |
| 4,714,593 | 12/1987 | Naito et al. | 422/197 |

FOREIGN PATENT DOCUMENTS

| | | | |
|---|---|---|---|
| 8700081 | 1/1987 | Int'l Pat. Institute | 423/652 |
| 8706221 | 10/1987 | Int'l Pat. Institute | 423/651 |
| 59-83904 | 5/1984 | Japan | 423/651 |
| 59-102801 | 6/1984 | Japan | 423/653 |

Primary Examiner—Wayne A. Langel
Attorney, Agent, or Firm—Cushman, Darby & Cushman

[57] ABSTRACT

The endothermic reaction of a hydrocarbon feedstock with steam and/or carbon dioxide is carried out using a double-tube reactor. In one preferred form of the reactor the catalyst is present as a coating on the outside of the inner tube. In another form inner tubes are mounted in one tube-plate and the outer tubes in a second tube plate and the tube plates are disposed across a cylindrical shell so as to define a heat exchange zone (provided with a heat source) a reactants feed zone and a products offtake zone. The heat source is preferably a burner, to be fed with the product of the endothermic reaction, followed by a secondary reforming catalyst. The apparatus makes possible processes for making raw hydrogen-containing gases with advantageous internal heat recovery.

2 Claims, 3 Drawing Sheets

STEAM REFORMING

This is a divisional application of Ser. No. 06/767,067, filed Aug. 19, 1985, now U.S. Pat. No. 4,750,986, which in turn is a divisional application of Ser. No. 06/591,328, filed Mar. 19, 1984, now abandoned.

This invention relates to reforming of hydrocarbons with steam and/or carbon dioxide and in particular to an apparatus and process for carrying it out.

In our published European application 21736 we describe a process for producing a gas containing hydrogen which comprises reacting in the gaseous phase a hydrocarbon, hydrocarbon derivative or carbon monoxide with steam and/or, where appropriate, carbon dioxide, in the presence of a catalyst supported on a metal or alloy resistant to the conditions in which the reaction is carried out; and more particularly a process for producing a gas containing hydrogen which comprises reacting in the gaseous phase a hydrocarbon or hydrocarbon derivative with steam and/or carbon dioxide, in the presence of a catalyst with a catalyst outlet temperature such that the product gas contains at least 30% v/v of hydrogen on a dry basis, in which the catalyst units comprise a support and at least one active metal selected from the group consisting of nickel, cobalt and the platinum group metals, characterised in that the catalyst support comprises a primary support made of a metal or alloy resistant to the conditions in which the reaction is carried out and a secondary support which is a layer of a refractory oxidic material adhering to the surface of the metal or alloy.

We have now realised that the use of the catalyst supported on the metal or alloy makes possible a new design of reforming apparatus and a new process sequence, which apparatus and sequence conveniently but not necessarily include the said catalyst.

According to the first aspect of the invention an apparatus for the endothermic reaction of a hydrocarbon or hydrocarbon derivative with steam and/or carbon dioxide comprises at least one outer tube open at one end and closed at the other, means to heat the outer tube externally, at least one inner tube within the outer tube and having an open end near the closed end of the outer tube, means to feed reactants to the space between the outer and inner tubes and to withdraw products from the inner tube, and a steam reforming catalyst in the space between the inner and outer tubes: characterised in that steam reforming catalyst is present as a layer adhering to the outer surface of the inner tube.

To afford adequate geometric surface for the steam reforming catalyst the outer tube can be of smaller diameter than has been common in steam reforming practice: up to 75 mm I.D., with an inner tube correspondingly small, leaving an annular space 5-20 mm wide, would be suitable. Possibly a larger outer tube, up to for example 150 mm I.D. can be used with a plurality of inner tubes. Preferably the inner tube has an extended surface, provided for example by fins or attached spikes or winding wires. The surface area is typically 3 to 10 times that of the smooth tube. A very suitable extended surface is provided by a multi (e.g. 6-10) start helix with in all 80 to 400 turns per m. The fins or helices can be continuous or interrupted.

The inner tube can contain a turbulator, to improve heat exchange between product gas and the reactants in the annular space. Neither the inner surface of the inner tube nor the turbulator should carry catalyst, of course.

The catalyst layer can itself be a catalyst by virtue of the choice of material of construction or of chemical or physical modification of its surface for example by cold-rolling of a nickel-containing unit. More commonly it is a support for active material, for example one or more metals from Group VIII of the Periodic Table. Especially when the support has a very low adsorptive surface, for example when it is a metal or alloy, it (as "primary support") carries a coating of adsorptive material ("secondary support") and the active material is associated with that coating. Preferably the Group VIII metal content, if non-noble, is in the range 30-60% w/w calculated as equivalent NiO on the total coating. Such adsorptive material typically has a pore volume over 0.2 $cm^3 g^{-1}$ and a surface area of at least 1.0, preferably over 15, especially in the range 50-200 $m^2 g^{-1}$. The secondary support preferably has a thickness in the range 0.01 to 0.3, especially 0.02 to 0.1 mm.

The secondary support typically comprises alumina, especially gamma or eta alumina. Other sesquioxides, for example, chromia and rare earth oxides may take up at least part of the secondary support. Other useful secondary support oxides are titania, zirconia, hafnia, thoria, vanadia, urania, oxides of maganese, molybdenum and tungsten and combined oxides.

Preferably the secondary support includes a grain growth inhibitor, for example at least 0.05, especially 0.1 to 5.0% by weight of yttrium or of one or more rare earth oxides, especially of cerium, or praseodymium.

When nickel and/or cobalt are present in the catalyst, it is expected that the secondary support, if it contains a sesquioxide, will include, at least after a period of process operation, some nickel and/or cobalt spinel. It is within the invention to have the secondary support material at least partly in the form of spinel, whether of nickel and/or cobalt or of a divalent metal having a difficultly reducible oxide, especially magnesium or manganese or, less preferably, zinc. Since nickel and/or cobalt present as spinel is in a reduction-resistant oxidic form, it does not contribute significantly to the activity of the catalyst: active nickel and/or cobalt are additional thereto.

In a catalyst comprising nickel and/or cobalt there may also be present one or more platinum group metals, which are capable of increasing the activity of the nickel and/or cobalt and of decreasing the tendency of carbon lay-down when reacting hydrocarbons higher than methane. The concentration of such platinum group metal is typically in the range 0.005 to 1% as metal, calculated on the coating. Further, the catalyst, especially in preferred forms, can contain a platinum group metal but no non-noble catalyst component. Such a catalyst is more suitable than one on a conventional support because a greater fraction of the active metal is accessible to the reacting gas. A typical content of platinum group metal when used alone is in the range 0.005 to 5% w/w as metal, calculated on the coating.

The specific surface of the catalytic metal is suitably in the range 1 to 500 $m^2/g$ of coating. Within these ranges the larger areas are preferred for reactions under 600° C.

When both non-noble and noble metals are present a useful level of catalytic activity can be obtained using a notably small concentration of such metals, namely under 2%, especially 0.01 to 0.5, % w/w in all, calculated on the total of secondary support and such metals. The preferred noble metal is rhodium.

The catalyst can be made by applying a compound of the active metal and the secondary support together in the primary support. In a preferred method the secondary support is applied to the primary support, the combination is preferably calcined, and then a solution containing a thermally decomposable compound of active metal is applied. When it is desired to regenerate the catalyst, the inner tubes can be withdrawn and retreated with a compound of the active metal.

As an alternative to the apparatus just described the invention provides a catalyst unit removable from the space between the outer and inner tubes.

According to the second aspect of the invention a contact material is in the form of tubular units having perforated walls and means to distance those walls from the walls of a surrounding container in which they are to be stacked in axial relationship with one another and with the container.

The invention provides also such a container charged with such units, which are so distanced from the container walls as to afford a space for fluid flow in contact with the container walls.

The means to distance the container walls from the unit walls can be integral with the unit walls (in which event the unit is a new article) or can be provided by spacers around or stacked between units that need not themselves have integral distancing means.

The purpose of the perforations is to permit fluid flow in at least one direction transverse to the general direction of flow through the container. This is especially valuable when contact with the units involves absorption of evolution of heat, and thus the invention includes a heat exchange apparatus including such a charged container, especially a tube and means for heat exchange through the container walls. Examples of such heat exchange apparatus are a steam reforming furnace, an ammonia cracker and a heavy hydrocarbon cracker (all endothermic processes) and a methanator, ammonia synthesis reactor, methanol synthesis reactor, aromatisation reactor, ammonia/water absorber or ammonia/acid reactor (all exothermic processes).

The perforations in the unit walls typically amount to between 20 and 60% of the unit wall area. For many purposes, but especially a hydrocarbon steam reforming process at for example 10-60 bar abs pressure, the smallest dimension of the perforations is at least 1 mm preferably in the range 2-5 mm.

Especially when, as is preferred, the units are made of metal or alloy, the perforations are the result of punching metal foil or sheet, and preferably each such punching leaves at least one internal or external vane attached to the unit wall; such vanes increase the geometric surface of the unit and can, if suitably pitched, ensure better contact with the container walls and thus improved heat transfer.

The distancing means typically define, in cross-section, a circumscribed circle having a diameter between 1 and 30%, especially between 5 and 20%, greater than that of the unit. If such means is integral with the unit, there are at least 3 projections to ensure equidistance from container walls, and such projections may occur at least at or near both vertical extremities of the unit, to ensure co-axial stacking; alternatively the units may interlock, so that one extremity of each is located by the neighbouring unit; or only alternating units in a stack need be externally projected. In an extreme case the outer wall of each unit can be corrugated, that is, be formed with a close succession of projections.

If spacers are used, these can be for example other tubular units of greater diameter having internal projections on which the distanced units rest. Such other units may fit snugly or loosely in the container. Alternatively the spacers can be shorter tubular units or even essentially planar, for example, toothedings or non-slip washers.

The above-mentioned internal vanes, or possibly other internal projections, can also serve to distance the units from an internal heat exchange surface or from other units stacked inside them.

The units can, if desired, be linked together axially, for example in stacks of 2 to 100, to facilitate charging to a tubular container.

The invention in its second aspect provides further a catalyst support in which each unit is made of highly calcined ceramic or of metal or alloy and carries a layer of catalyst support material as already described, a catalyst precursor in which such support carries a compound convertible to catalyst by reduction and/or sulphidation, and the so-formed catalyst. Such a compound is typically of one or more metals from Groups Ib, V, VII or VIII of the Periodic Table especially as described above. If desired, any spacers used can also be coated with such catalyst support and/or catalytic precursor or active material.

The invention provides also chemical processes carried out in such apparatus or over such catalysts. In particular the reaction of a hydrocarbon with steam and/or carbon dioxide to produce a gas containing at least 30% v/v of hydrogen on a dry basis is operated at 550°-1000° C. and at 1-60 bar abs pressure. In a typical process of this kind the geometric surface of the catalyst is well below the level of about 300 m$^{-1}$ common when using conventional ceramic ring catalyst, and is, for example, in the range 40-200 m$^{-1}$. As a result the pressure drop can be under 10%, for example 0.1 to 2.0%, that of such conventional rings. Catalyst units to be used are for example 40-160 mm in diameter excluding external projections or spacers.

For such processes the hydrocarbon feedstock preferably has a boiling point not over 220° C. and is most conveniently normally gaseous, especially has a hydrogen to carbon atomic ratio of at least 3.5. If a hydrocarbon derivative is used it is most conveniently methanol or ethanol.

According to a third aspect of the invention an apparatus for the said endothermic reaction comprises
an outer shell;
mutually parallel first and second tubeplates disposed across the shell and dividing it into three successive zones, namely a heat exchange zone, a reactants feed zone and a products off-take zone;
at least one relatively wide tube extending into the heat exchange zone from the first tube plate bounding that zone and closed at its extremity within that zone;
at least one relatively narrow tube extending from the second tube plate into the extremity of each relatively wide tube; and
a steam reforming catalyst in the annular space between the tubes.

The outer surface of the relatively narrow tube preferably carries an adherent layer of the catalyst, but it can carry catalyst units mechanically linked to it, or there can be structured, especially tubular units according to the second aspect of the invention, or loose, catalyst in the annular space.

Especially if the adherent catalyst is used, each relatively wide tube preferably has its closed extremity upwards, for these reasons:
(a) piping connections are facilitated;
(b) removal of the inner tube to permit catalyst replacement is facilitated;
(c) the space between the outer tubes can be packed, thus improving heat transfer;
(d) use of secondary reformer gas as heat source can be facilitated, as will be described below.

The outer shell preferably withstands superatmospheric pressure, especially in the range 5-120, for example 25-80, bar abs.

In the apparatus according to the first or third aspect of the invention there is provision to heat the outer (wide) tubes externally. This can be for example one or more fuel burners within the external shell: in this event, to avoid excessive flame temperatures and production of oxides of nitrogen, two such burner systems can be used in series, the first fed with a substantial excess of combustion air and the second fed with the oxygen-containing effluent of the first. Either system, but more especially the second, can include a combustion catalyst. When two such burner systems are used in series, the reaction tubes are preferably operated in parallel, especially when the product is to be methanol synthesis gas or hydrogen.

In another example the source of heat can be the effluent from a high temperature chemical reaction step, especially from a catalytic "secondary reformer" in which the product gas from the endothermic reaction is reacted with oxygen to decrease its methane content. Such a secondary reforming step can be carried out in a separate vessel; but very suitably the heat exchange zone contains, upstream of the tube, a bed for a secondary reforming catalyst and, upstream of that bed and spaced from it so as to avoid damage to the catalyst a secondary reformer burner, in which primary reformer gas and oxygen, possible as air or enriched air, are brought together and reacted in a flame.

In a further example the source of heat is a gas heated in a nuclear reactor.

When the source of heat is combustion of fuel, this is carried out preferably at superatmospheric pressure and the combustion gas is expanded in an engine to provide useful power. The combustion pressure preferably differs from that of the reactants inside the bues by not more than 20 bar from the reactants pressure inside the tubes.

The invention provides also a set of processes for producing raw hydrogen streams.

In particular the invention provides a process for producing raw ammonia synthesis gas by the steps of
(a) primary reforming a hydrocarbon feedstock with steam to give a gas containing carbon oxides, hydrogen, methane and unreacted steam;
(b) reacting the product of step (a) catalytically with an oxygen/nitrogen mixture to decrease its content of methane and introduce nitrogen; and
(c) obtaining part of the endothermic heat required for step (a) from the hot effluent of step (b);
characterised by carrying out step (a) in 2 stages, the first heated by the hot effluent of step (b), the second heated from an external heat source.

Such a process differs from previous proposals, in which the two stages of step (a) are to be carried out in the opposite order. The reason for this was that previously available catalysts had little activity at below about 650° C. and therefor required the very intense heating from the external heat source at the start of reaction, at which the reactants partial pressure is high and the endothermic heat demand correspondingly high. In such processes recovery of heat from the effluent of step (b) was by heat exchange with gas that had already reacted to a substantial extent in step (a); therefore the temperature difference was small and much heat had to be recovered by other means. By using the process of the invention the effluent of step (b) can be cooled to 450° to 600° C., resulting in substantially greater heat recovery within the reforming steps than was previously convenient. Less heat need be recovered as high pressure steam, the demand for which is in any event less in recently developed ammonia production processes including steam reforming at relatively low steam ratios and limited synthesis gas compression.

The second part of step (a) can be carried out in a pressure furnace or an ordinary steam reforming furnace fired at atmospheric pressure.

In the process the oxygen/nitrogen mixture can be air and can be fed at a rate producing after shift and $CO_2$-removal, a synthesis gas having an $H_2:N_2$ ratio approximately stoichiometric (usually 2.5-3.0). If desired, the ratio can be lower, as for example with nitrogen removal from reacted synthesis gas in the process of our European patent 993, or with nitrogen removal before the gas enters ammonia synthesis. If carbon oxides are to be removed by methanol synthesis, the ratio is chosen to suit the relative outputs of methanol and ammonia.

Alternatively raw hydrogen, or a raw synthesis gas for conversion to organic compounds, is produced by the process modified by feeding an oxygen-rich gas (over 80, especially over 95% v/v) at step (b).

The invention also provides processes in which the sources of heat are entirely external and heat recovery from hot gases is conventional, for example by steam superheating and steam raising and preheating of boiler feed water.

Corresponding to the third aspect of the invention the invention provides also a process for producing a raw hydrogen stream convertible to ammonia synthesis gas or hydrogen-rich gas or organic compounds synthesis gas, by the steps of
(a) feeding a mixture of a hydrocarbon feedstock with steam into a plenum zone and therein heat exchanging it with a hot stream to be described in tubes to be described surrounded by that zone;
(b) feeding the resulting heated mixture into a plurality of annular blind heated catalyst zones each surrounding one of the said tubes and each heated externally in a heat exchange zone by a medium to be described, and reacting the mixture therein to produce a gas containing carbon oxides, hydrogen, methane and steam;
(c) feeding the resulting reacted mixture back through the said tubes in heat exchange with the reacting mixture and then as the said hot stream with the mixture in the plenum zone, whereby partly to cool the reacted mixture;
(d) collecting the partly cooled gas in a products offtake zone, feeding it to a burner, partially combusting it with oxygen as such or as air or oxygen-enriched air (depending on the intended nitrogen content of the raw hydrogen stream to be produced) and passing the combustion product over a catalyst whereby to decrease the methane content thereof, the said burner and catalyst being disposed in the heat exchange zone specified in step (b);

(e) passing the catalyst effluent as the said medium in heat exchange with the exteriors of the said annular catalyst zones.

In any such processes there follow steps of cooling and removal of excess steam as liquid water. When the product is to be ammonia synthesis gas or hydrogen-rich gas, the raw gas is subjected also to shift, $CO_2$-removal and fine purification from traces of carbon oxides.

The invention is illustrated by the accompanying drawings, in which

FIG. 4b is an axial view of the unit shown in FIG. 4a.

Figure 1:
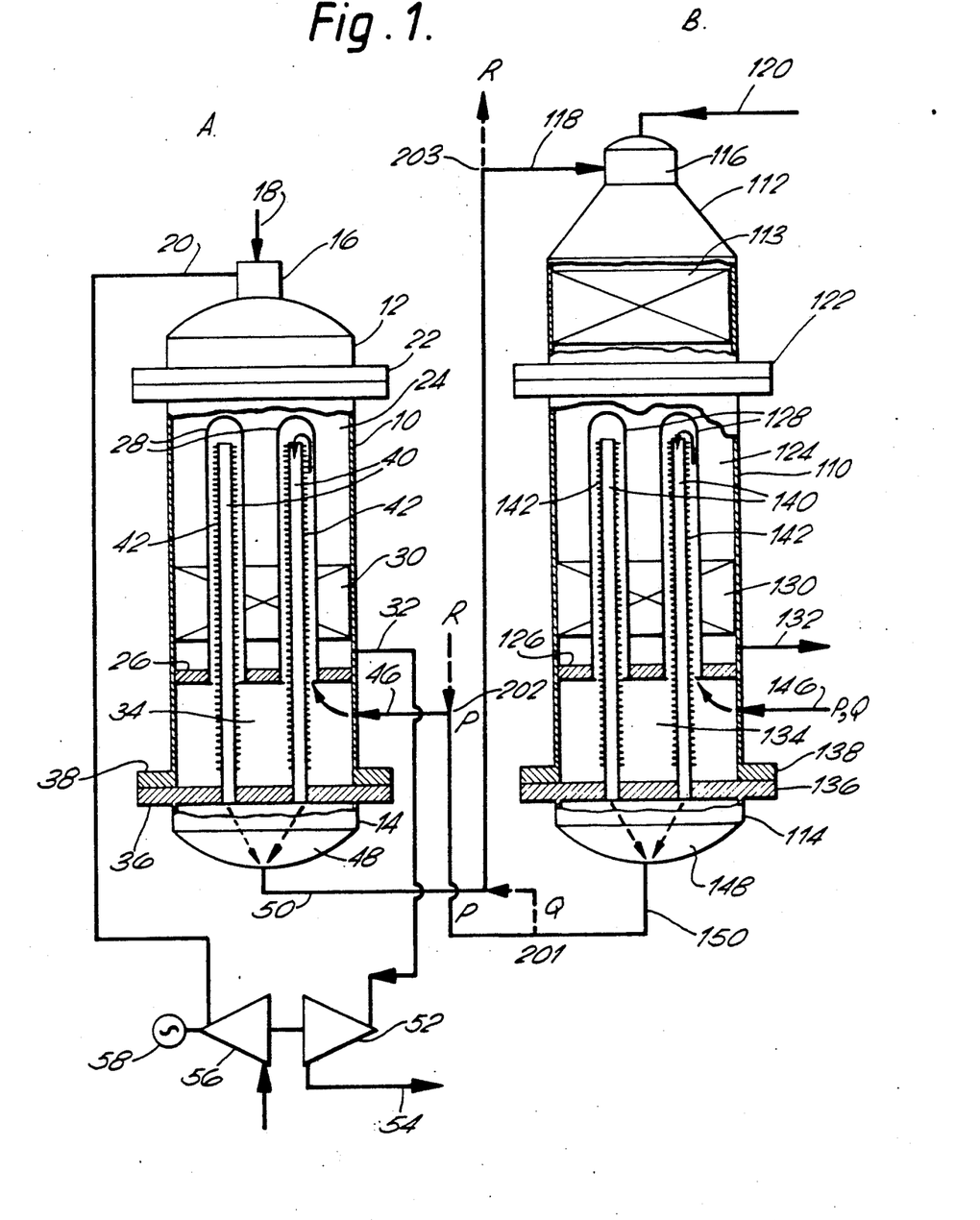
FIG. 1 shows in diagrammatic vertical section two preferred forms A and B of apparatus according to the first and third aspects of the invention and a preferred combination thereof.

In FIG. 1 the full line paths labelled P refer to the combination and dotted paths labelled Q and R to independent operation of A or B. For convenience, integers of both apparatuses are indicated by corresponding numbers, those in B exceeding those in A by 100. The points of divergence of the paths P, Q and R are indicated by numerals 201, 202 and 203.

The outer shell consists of cylindrical centre portion 10, 110, upper portion 12, 112 and lower portion 14, 114. Upper portion 12, 112 is formed with a mixing and burner zone 16, 116, to which is connected a fuel inlet 18 or gas inlet 118 and an air inlet 20, 120, and is joined by flange 22, 122 bolted 22 to cylindrical centre portion 10, 110. The upper portion 112 of apparatus B also contains secondary reforming catalyst bed 113.

Centre portion 10, 110 is divided horizontally by tube plate 26, 126 the space above which constitutes the heat exchange zone 24, 124 in virtue of the "outer" heat exchange tubes 28, 128 extending upwards from the tube plate with closed upper ends. Zone 24, 124 includes a packed region 30, 130 to improve heat exchange between hot gases outside and reactants inside tubes 28, 128, and an outlet which (32) in A is for flue gas and (132) in B is for cooled secondary reformer outlet gas.

Beneath tube plate 26, 126 is reactants feed zone 34, 134 bounded by tube plate 36, 136, which extends outwards to form a flange bolted to flange 38. Tubes 40, 140 each having an extended, catalyst-coated surface 42, 142, extended upwards from tube plate 36, 136 almost to the closed end of tubes 28, 128. The inner surfaces of outside tubes 28, 128 may or may not have a catalyst coating.

Beneath tube plate 36, 136 is product offtake zone 48, 148 from which outlet 50 in A leads to gas inlet 118 in B, and outlet 150 in B leads to gas inlet 46 in A.

Outlet 32 in A leads to gas turbine 52 which exhausts at 54 to low grade heat recoveries (not shown) and which drives combustion air compressor, 56 feeding air inlet 20 and alternator 58.

The process for producing raw ammonia synthesis gas by the first process aspect of the invention can follow path P in the apparatus combination. A mixture of desulphurised natural gas and steam at for example 200°–450° C. is fed at 146 of B to reactants feed zone in which it is heated by heat exchange with the gas in tube 140. It passes up the annular space in contact with catalyst 142 receiving heat both from inner tube 140 and from heat exchange zone 124, until at the top its temperature is for example 650°–750° C. and its methane content is for example 20–40% v/v on a dry basis. It then passes down inner tube 140 as a source of heat for incoming gas and leaves the bottom portion 114 of the shell by way of products offtake zone 148 and outlet 150 en route for reactants inlet 46 of A. The source of heat in zone 124 of B will be described below.

In A the path of the gas is as in B but in contact with the catalyst, the reactants are heated more strongly, to a final temperature of for example 800°–850° C., by combustion of fuel fed at 18 with hot air fed at 20, part of the heat exchange being radiative. Combustion is at superatmospheric pressure and the hot flue gas is expanded through turbine 52 driving compressor 56. Gas leaving at 50 is fed at 118 to the top portion 112 of B and reacted with air fed at 120. A flame is formed and the hot gases are brought to equilibrium at for example 900°–1000° C. over secondary reforming catalyst bed 113, whereafter it forms the heat source for the first stage of reforming in B. After cooling in heat exchange zone 124 aided by packing 130 the gas leaves by 132, whence it is passed to further heat recoveries and to steps of shift, $CO_2$-removal and fine purification to give ammonia synthesis gas.

Vessels 10 and 110 are preferably provided each with a jacket (not shown) through which cool air or water is circulated, to keep down the temperature of the pressure-resisting shell and maintain its internal refractory lining in compression. When jacket cooling is by air, the resulting warm air can be used, preferably after further warming, as combustion air for burner 16.

The process for producing raw hydrogen or a raw synthesis gas for conversion to organic compounds according to the second process aspect of the invention can follow path Q in the apparatus, using apparatus B only. The process is the same as in the combination as far as point 201, except that the methane content of the gas leaving at 150 is preferably in the range 0.2 to 5% v/v on a dry basis, and that, if the starting hydrocarbon feedstock is hydrogen-rich, the feed at 146 may include carbon dioxide. Following path Q from point 201 the gas flows through line 118 and enters mixer/burner zone 116, in which it reacts with oxygen or possibly enriched air fed in by line 120. The resulting heat evolution is sufficient to reform the methane present in the gas at 118 and to heat tubes 128, without the external heat required (apparatus A) when making ammonia synthesis gas. After cooling in heat exchange zone 124 aided by packing 130 the gas leaves by 132. Thereafter it is passed to further heat recoveries and to steps of shift, $CO_2$-removal and fine purification to give hydrogen, or to cooling and water removal to give synthesis gas.

In an alternative process for producing raw hydrogen or a raw synthesis gas path R in apparatus A is followed. The starting mixture of hydrocarbon and steam, possibly with $CO_2$, is fed at point 202 and reacts as described above, leaving finally at point 203, whence it undergoes heat recoveries and process steps as already described. If ammonia synthesis gas is required, a conventional air secondary reformer can be used.

Especially if apparatus A only is to be used, two such apparatuses are used side-by-side, with their combustion sections in series and reaction sections in parallel. Thus line 20 feeds approximately double the quantity of air required in A, line 32 leads to an inlet line corresponding to 20 in the second apparatus A and the outlet line corresponding to 32 in that second apparatus A leads to the inlet of turbine 52. However, line 46 is bifurcated and feeds both apparatuses, and the outlet lines 50 are joined before passing to the next unit downstream.

The Table (first part) shows temperatures, pressures and gas compositions for the production of raw ammonia synthesis gas using apparatuses A and B in combination, with non-enriched air fed at 120. The second part shows such data for producing raw methanol synthesis gas using apparatus B only, with substantially pure oxygen fed at 120. It is evident that by using apparatus B only and feeding non-enriched air at 120 a raw ammonia synthesis gas containing nitrogen in excess can be obtained and that to use such a gas in ammonia synthesis a subsequent step of nitrogen removal, before or after synthesis, will be included. Further, by feeding moderately enriched air at 120 the extent of nitrogen removal can be decreased, for example to zero when the hydrocarbon feedstock is methane and the oxygen percentage is about 35% v/v.

Figures 2, 3A, 3B:
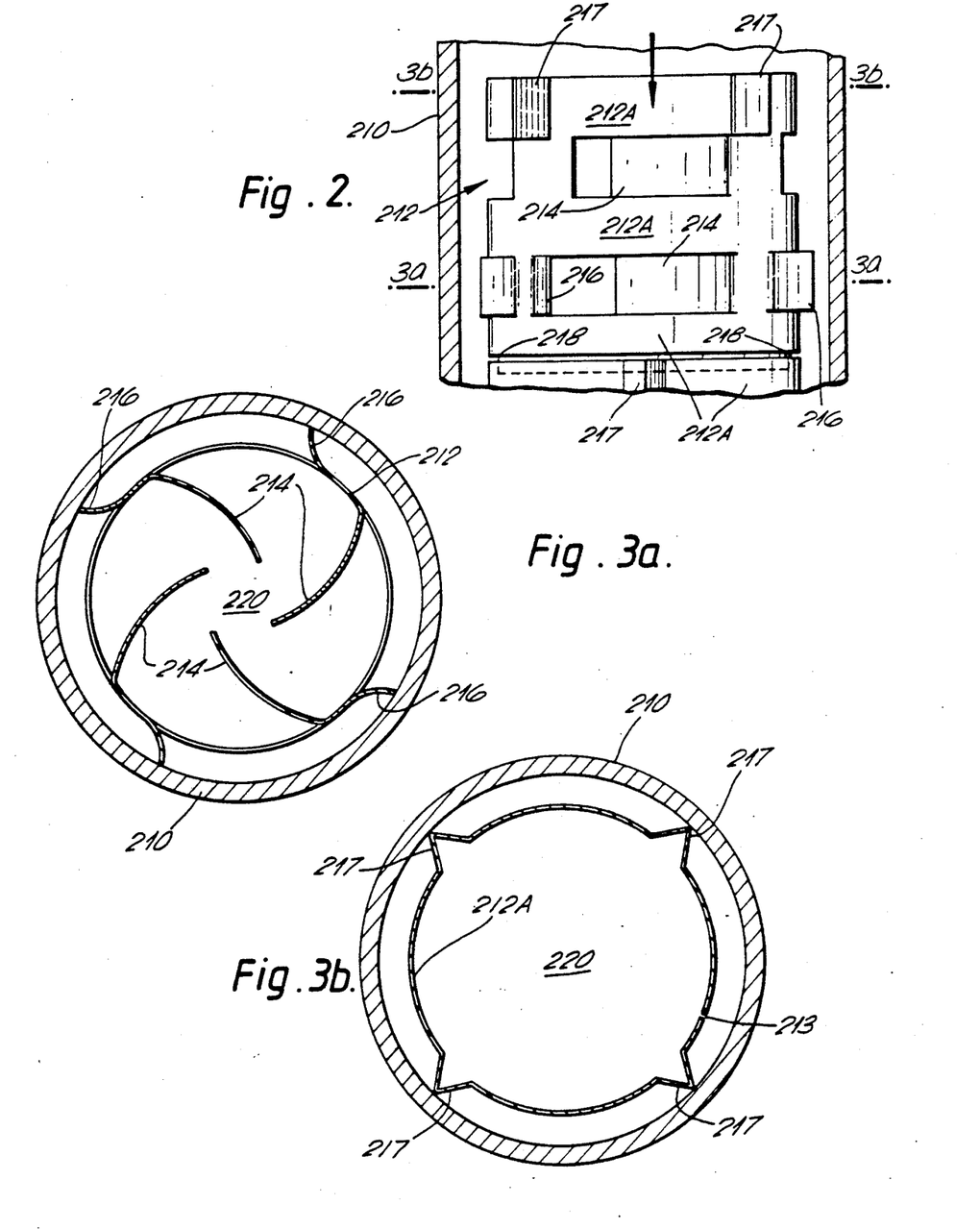
FIG. 2 represents a unit according to the second aspect of the invention in position in a container which is a heat exchange tube.
FIG. 3a is a section on line 3a—3a in FIG. 2.
FIG. 3b is a section on line 3b—3b in FIG. 2.

If desired, internal vanes 214 can meet or join in axial space 220. More usefully, space 220 can have a cross-sectional diameter 30-80% of that of unit 212 and can be occupied by a similar unit of such a diameter but of the same general shape as unit 212. In a very useful form of the invention, also not shown, space 220 can be occupied by a further heat exchange tube, and possibly the bottom of tube 210 can be blind, so that gas flowing down through tube 210 in contact with units 212 flows upwards through the axial tube. Upward flow followed by downward flow is equally possible.

The following further alternative combinations of units are envisaged:
(a) a unit as shown but without external projection 216 or 217 having above and beneath it a unit of greater diameter occupying more of the width of tube 210 or possibly fitting snugly as a result of compression of that unit to close gap 213. The smaller units in such a combination can at their ends lie within the larger units resting on vanes 214.
(b) units as shown but without external projections 216 or 217, each successive pair separated by a ring having at least 3 external projections and out-of-plane projections locating the units diametrally— for example a highly pitched non-slip washer.

Figure 4A:
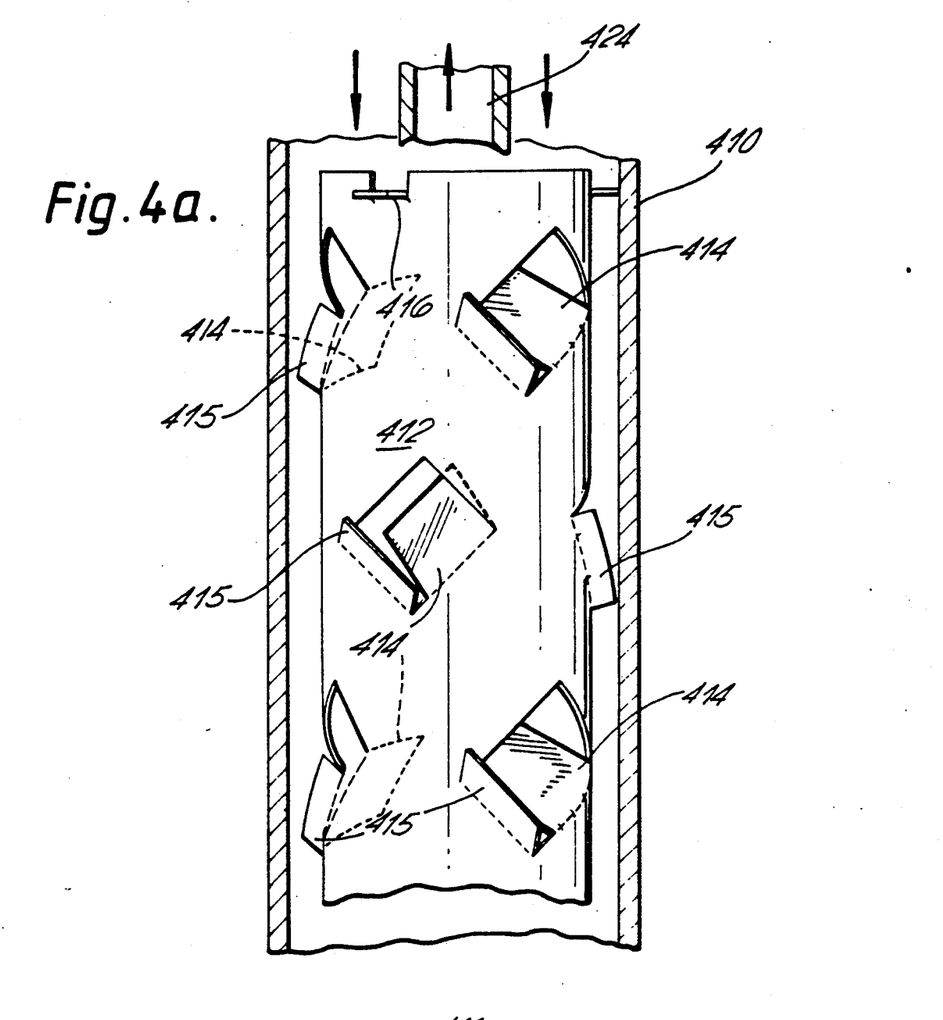
FIG. 4a is a side view of an alternative unit according to the second aspect of the invention.
Figure 4B:
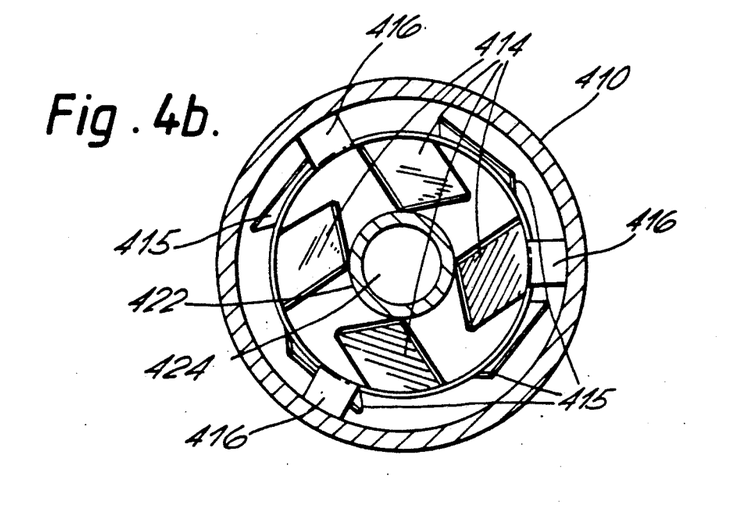

FIGS. 4a, b show an alternative unit in which internal

TABLE

| Position | Temp. °C. | Press bar abs. | Gas composition % v/v | | | | | |
|---|---|---|---|---|---|---|---|---|
| | | | CO | $CO_2$ | $H_2$ | $CH_4$ | $N_2$ + Ar | $H_2O$ |
| Ammonia synthesis gas | | | | | | | | |
| 146 | 400 | 40 | — | — | 2.0 | 24.5 | — | 73.5 |
| 140 inlet | 733 | 39.5 | 2.1 | 5.3 | 27.5 | 13.9 | — | 51.2 |
| 150 | 592 | 39 | 2.1 | 5.3 | 27.5 | 13.9 | — | 51.2 |
| 40 inlet | 825 | 38.5 | 6.1 | 5.7 | 41.0 | 7.3 | — | 39.9 |
| 50 | 700 | 38.2 | 6.1 | 5.7 | 41.0 | 7.3 | — | 39.9 |
| 113 inlet | 950 | 38 | 8.3 | 5.0 | 35.8 | 0.7 | 17.3 | 32.9 |
| 132 | 550 | 37.5 | 8.3 | 5.0 | 35.8 | 0.7 | 17.3 | 32.9 |
| 52 inlet | 730 | 7.0 | — | — | — | — | — | — |
| Methanol synthesis gas | | | | | | | | |
| 46 | 390 | 12 | — | — | 0.6 | 19.9 | — | 79.5 |
| 40 inlet | 790 | 11.5 | 6.2 | 6.2 | 43.9 | 2.5 | — | 41.2 |
| 50 | 580 | 11.2 | 6.2 | 6.2 | 43.9 | 2.5 | — | 41.2 |
| 52 inlet | 730 | 7.0 | — | — | — | — | — | — |

In FIGS. 2 and 3a, 3b heat exchange tube wall 210 is for example a tube externally heated in a steam reforming furnace and the unit 212 is made of stainless steel and carries a coating of alumina and metallic nickel. The unit includes solid portions 212A, which may at the top, bottom and centre form a complete circle or may be split at 213, such that its shape is maintained by the resilience of the alloy. From the generally cylindrical walls of the unit, vanes 214 project inwardly to provide an internal contact surface; and small tongues 216 (FIG. 3a) or ribs 217 (FIG. 3b) project outwardly to keep the unit walls at a separation from heat exchange tube wall 210. Vanes 214 and 216 are formed by stamping from the wall metal, and thus leave perforations in the walls. Ribs 217 are formed by pressing between toothed and grooved rollers during the shaping operation. Ribs 217 could be formed also on the middle or lower solid portions 212A or in the intervening portions. Alternatively or additionally one end of each unit can be necked at 218 to fit into the full-width end of the next unit above or beneath it, or succeeding units can be doubly-necked and of full width. The outer vanes and/or ribs of succeeding units need not be mutually aligned. The vanes and/or ribs can be pitched to set up a helical flow pattern in contact with the wall.

and external pitched vanes have been formed. The outer heat exchange tube having wall 410 is blind at is lower end, and inner heat exchange tube suspended within it provides the outlet for the reactants. Unit 412, which can be a single unit equal in length to the heat exchange tubes or can be one of an assemblage as in FIG. 2 has inward vanes 414 (havy outlines) but at an angle of 45° and outward vanes 415 punched from its walls and bent also at 45°, the root of the bend being indicated by the dotted lines. In the unit as shown vanes 414 direct the reactants outwardly, but equally the unit could be inverted to provide direction inwardly, or a single unit could carry both types of vane, or two types of unit could be stacked in alternation. Outward vanes 415 direct the reactants inwardly from the outer wall: they could extend outwardly far enough to contact the outer wall, but tongues 416 are provided for correct location of the unit.

When reactants pass through the unit they undergo endothermic reaction while in contact with it but at short intervals leave the surface and mix with reactants that have entered the unit by way of the perforations, having been reheated at wall 210, 410. In this way a high over-all rate of reaction is maintained. As the reactants pass downwardly their temperature gradually increases as a result of heat fed in from the furnace surrounding tube 210, 410 until sufficient conversion has taken place. If an axial tube such as 424 is present, the hot converted reactants flowing upwardly through it give up heat to the reactants flowing downwardly over units 212, 412 in the annular space between the tubes.

In experimental trials in standard methane steam reforming conditions as described in our European application 21736, catalyst units as described in FIGS. 2 and 4, made of stainless steel and carrying a coating of alumina and metallic nickel showed activity of the same order as that of commercial catalyst, but at a much lower pressure drop. exchange tube having wall 410 is blind at is lower end, and inner heat exchange tube suspended within it provides the outlet for the reactants. Unit 412, which can be a single unit equal in length to the heat exchange tubes or can be one of an assemblage as in FIG. 2 has inward vanes 414 (havy outlines) but at an angle of 45° and outward vanes 415 punched from its walls and bent also at 45°, the root of the bend being indicated by the dotted lines. In the unit as shown vanes 414 direct the reactants outwardly, but equally the unit could be inverted to provide direction inwardly, or a single unit could carry both types of vane, or two types of unit could be stacked in alternation. Outward vanes 415 direct the reactants inwardly from the outer wall: they could extend outwardly far enough to contact the outer wall, but tongues 416 are provided for correct location of the unit.

When reactants pass through the unit they undergo endothermic reaction while in contact with it but at short intervals leave the surface and mix with reactant that has entered the unit by way of the perforations, having been reheated at wall 210, 410. In this way a high over-all rate of reaction is maintained. As the reactants pass downwardly their temperature gradually increases as a result of heat fed in from the furnace surrounding tube 210, 410 until sufficient conversion has taken place. If an axial tube such as 424 is present, the hot converted reactants flowing upwardly through it give up heat to the reactants flowing downwardly over units 212, 412 in the annular space between the tubes.

In experimental trials in standard methane steam reforming conditions as described in our European application 21736, catalyst units as described in FIGS. 2 and 4, made of stainless steel and carrying a coating of alumina and metallic nickel showed activity of the same order as that of commercial catalyst, but at a much lower pressure drop.

I claim:

1. A process for producing a hydrogen-containing gas stream comprising the steps of
   a) feeding a reactants mixture of a hydrocarbon feedstock and steam into a plenum zone;
   b) passing hot gas through a plurality of first tubes, each of which has a portion extending through said plenum zone and an inlet portion outside said plenum zone, and effecting heat exchange in said plenum zone between said hot gas and said reactants mixture thereby forming a heated reactants mixture;
   c) feeding the heated reactants mixture from said plenum zone into externally heated annular zones located in a heat exchange zone,
      each of said annular zones being associated with one of said first tubes and defined by
      the inlet portion of the associated first tube; and
      a second tube extending from the plenum zone and surrounding the inlet portion of the associated first tube,
      each of said second tubes being closed at the end thereof remote from said plenum zone;
   d) reacting said heated reactants mixture in said annular zones over a first catalyst disposed within said annular zones to produce reformed gas containing carbon oxides, hydrogen, methane, and steam;
   e) feeding the reformed gas from each annular zone into the inlet portion of the first tube defining that annular zone, and through the inlet portion of that first tube in heat exchange with the heated reactants mixture undergoing reaction in the annular zone and then through the portion of that first tube extending through said plenum zone as said hot gas in heat exchange with the reactants mixture in the plenum zone, thereby partly cooling said reformed gas;
   f) collecting the partly cooled reformed gas from said first tubes in a products offtake zone, feeding the partly cooled reformed gas to a burner, partially combusting it with an oxygen-containing gas selected from the group consisting of oxygen, air, and oxygen-enriched air and passing the combustion products over a second catalyst whereby to decrease the methane content thereof; and
   g) passing the effluent from said second catalyst past the exteriors of the second tubes whereby to provide the external heating of the annular zones.

2. A process according to claim 1 wherein said burner and second catalyst are disposed within said heat exchange zone but upstream of the closed ends of the second tubes.

* * * * *

UNITED STATES PATENT AND TRADEMARK OFFICE
CERTIFICATE OF CORRECTION

PATENT NO. : 5,039,510

DATED : August 13, 1991

INVENTOR(S) : PINTO, Alwyn

It is certified that error appears in the above-identified patent and that said Letters Patent is hereby corrected as shown below:

Title page:

[30]   Foreign Application Priority Data

March 25, 1983   [GB]   Great Britain ...... 8308343

Signed and Sealed this

Ninth Day of February, 1993

Attest:

STEPHEN G. KUNIN

*Attesting Officer*         *Acting Commissioner of Patents and Trademarks*